(No Model.)
E. DEUSING.
VEHICLE RUNNING GEAR.
No. 482,234. Patented Sept. 6, 1892.
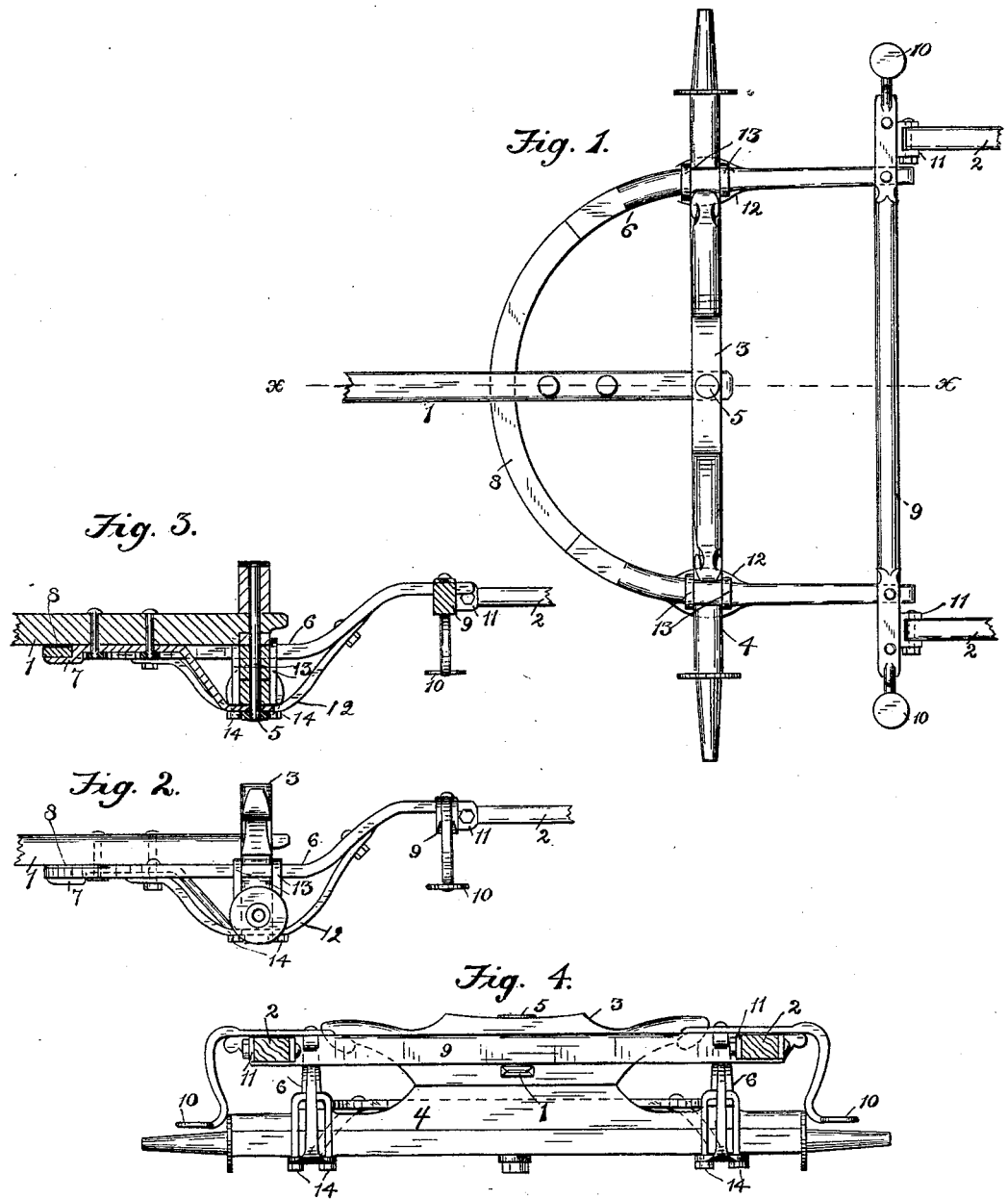
WITNESSES:
Thomas Durant
Wallace Murdock
INVENTOR
Edward Deusing,
BY Church & Church
his ATTORNEYS

United States Patent Office.

EDUARD DEUSING, OF ROCHESTER, NEW YORK, ASSIGNOR OF ONE-HALF TO GEORGE ZIERES, OF SAME PLACE.

VEHICLE RUNNING-GEAR.

SPECIFICATION forming part of Letters Patent No. 482,234, dated September 6, 1892.

Application filed April 4, 1892. Serial No. 427,948. (No model.)

*To all whom it may concern:*

Be it known that I, EDUARD DEUSING, of Rochester, in the county of Monroe and State of New York, have invented certain new and useful Improvements in Vehicle Running-Gear; and I do hereby declare the following to be a full, clear, and exact description of the same, reference being had to the accompanying drawings, forming a part of this specification, and to the reference-numerals marked thereon.

My present invention relates to improvements in running-gear for vehicles; and it consists in certain novelties in construction and combinations of parts, all as will be hereinafter fully described, and the novel features pointed out particularly in the claims at the end of this specification.

In the accompanying drawings, Figure 1 is a plan view of running-gear constructed in accordance with my invention; Fig. 2, a side elevation; Fig. 3, a sectional view on the line $x\ x$ of Fig. 1; Fig. 4, a front elevation.

Similar reference-numerals in the several figures indicate similar parts.

1 indicates the ordinary reach or perch, to the end of which is secured the rear axle, as usual, while to the forward end is secured the bolster 3, adapted to support the forward spring of a three-spring wagon.

4 indicates the forward axle, on which the bolster rests and to which it is secured by the king-bolt 5.

6 indicates the combined hounds and fifth-wheel or slide, preferably composed of a single piece of wood or metal resting on the axle on opposite sides of the center, its rear portion continued around in a semicircle beneath the reach and held thereto by the usual plate 7, a suitable wear-plate 8 being arranged on its upper side, as shown. The ends of this part 6 extend forward of the axle a considerable distance, as shown, and are connected by a bar 9, bolted to them, said bar extending a slight distance beyond the ends, as shown, and having secured to its opposite ends the steps 10, situated in front of the forward wheels of the vehicle. To the front of the bar 9 are attached clips 11, to which the thills 2 of the wagon may be secured in the ordinary manner. The combined hounds and fifth-wheel or slide 6 is attached to the axle, preferably, by means of a brace-plate 12, passing beneath the axle, its ends being bolted to the part 6, and the connection being made secure by means of U-shaped clips 13, extending over the top of the part 6, the threaded ends of which pass through perforations in the plate 12 and adapted to receive nuts 14. The plate 12, it will be noted, serves as a brace to the outer forward end of the part 6, and by locating the step 10 on the cross-bar connecting the forward ends of the part 6 the weight of a person entering or leaving the vehicle by means of the step will be transferred directly to the reach through the fifth-wheel, thereby preventing the galling of the horse's back, which usually results when the step is applied directly to the thills and supported at the forward end only upon the back pad or saddle. The bar 9, connecting the forward ends of the part 6, serves to brace the latter considerably, as the distance from the axle is rather long, and also as a means for the attachment of the step and prevents said ends from being twisted when the weight of the driver is on the step.

This invention is particularly applicable to light delivery-wagons, commonly known as "three-spring" wagons, in which the driver is constantly ascending and descending from his seat by means of the step, and by the use of this invention the horse's back is not made sore, as is liable to be the case when the step is supported directly on the thills.

It will be understood that the step could be secured to the forward portion of the part 6 and also that the thills could be attached to the ends by suitable clips; but I prefer to make the parts as shown, as the construction is facilitated and the parts are braced in a better manner.

I claim as my invention—

1. The combination, with the reach and axle, of the combined hounds and slide having the semicircular part beneath the reach, the ends extending forward of the axle, the clips for the connection of the thills on said ends, and the step connected thereto, substantially as described.

2. The combination, with the reach and axle, of the combined hounds and slide having the semicircular part beneath the reach and the ends extending forward of the axle, the cross-bar connecting said ends, the clips for the thills thereon, and the step secured to the end of said bar, substantially as described.

3. The combination, with the reach and axle, of the combined hounds and slide having the semicircular part beneath the reach and the ends extending forward of the axle, of the plates 12, passing beneath the axle and secured at the ends to the slide, and the clips connecting said plates to the slide on opposite sides of the axle, substantially as described.

EDUARD DEUSING.

Witnesses:
FRED F. CHURCH,
HORACE MCGUIRE.